(No Model.)

A. V. TRUST.
Amalgamator.

No. 243,659. Patented June 28, 1881.

WITNESSES:
S. J. Van Stavoren
J. B. Connolly

INVENTOR
Alexander V. Trust
By Connolly Bros
ATTORNEYS

UNITED STATES PATENT OFFICE.

ALEXANDER V. TRUST, OF NEW YORK, N. Y.

AMALGAMATOR.

SPECIFICATION forming part of Letters Patent No. 243,659, dated June 28, 1881.

Application filed July 12, 1880. (No model.)

*To all whom it may concern:*

Be it known that I, ALEXANDER V. TRUST, of New York, in the county of New York and State of New York, have invented certain new and useful Improvements in Amalgamators, of which the following is a full, clear, and exact description, reference being had to the accompanying drawings, which form part of this specification, in which—

Figure 1:
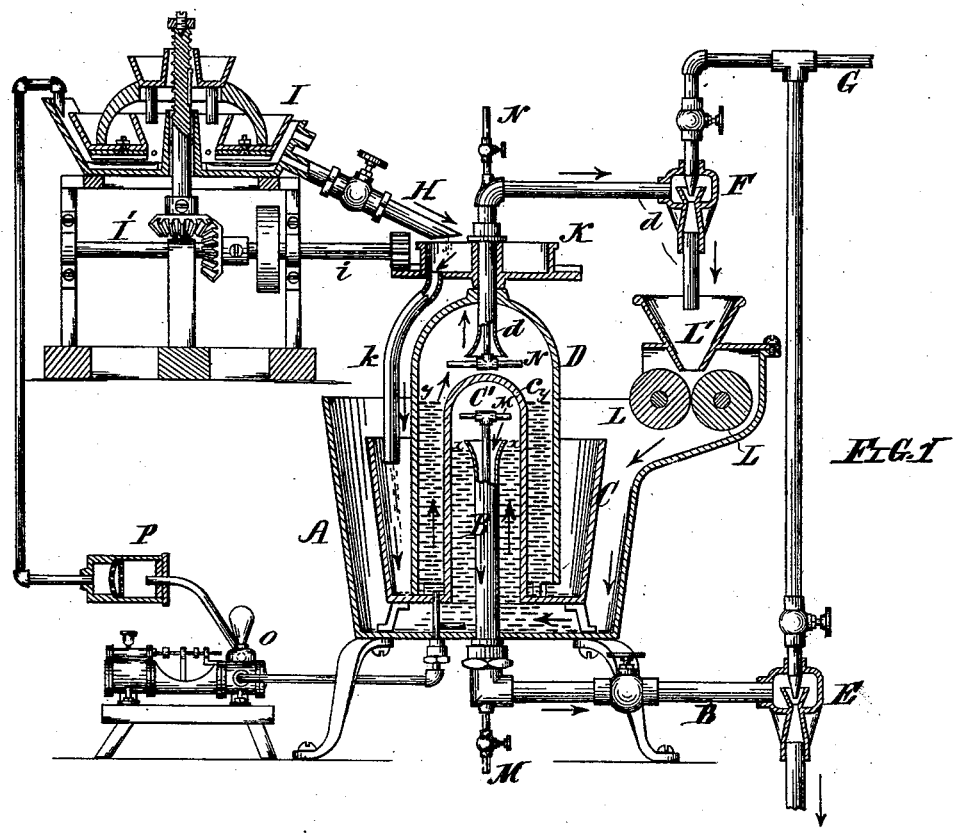
Figure 2:
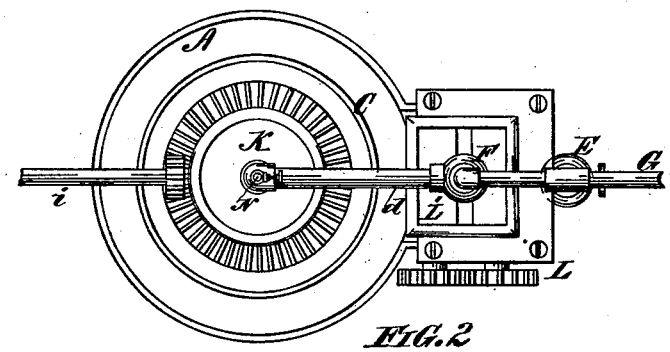

Figure 1 is a vertical central section, and Fig. 2 a plan view.

My invention has relation to the means and method shown and claimed in Letters Patent of the United States granted to me, dated June 29, 1880, No. 229,498, for improvements in amalgamators, and has for its object to provide appliances whereby the pulp, consisting of amalgam and waste, may be caused to pass through two separate chambers of one machine, and be elevated in each by suction or exhaust, so as to separate in the second chamber any amalgam that may have been carried off with the waste from the first chamber.

In the accompanying drawings, A designates a tank or tub, through the bottom of which projects a discharge-pipe, B.

Within the tub A, and supported above its bottom, is a vessel, C, having a central elevation or dome, $c$, the walls of which surround the discharge-pipe B, as shown, and form a suspension-chamber, C'.

Above the vessel C is a cylinder, D, whose lower end is open, and whose upper end is closed, but provided with a discharge-pipe, $d$. This pipe is continued so as to discharge into or over the tub A. The pipes B and $d$ are both furnished with ejectors E and F, respectively, and G is a pipe for supplying steam to said ejectors.

H represents a pipe or conduit for supplying pulp from an amalgamating-pan, I, to a rotary tank, K, which surmounts the cylinder D, and is provided with a discharge-pipe, $k$, that extends down into vessel C. Said tank K receives motion through a counter-shaft, $i$, from the shaft I' of pan I, and its discharge-pipe $k$ acts as an agitator for vessel C.

L L are crushing-rolls located below the discharge end of pipe $d$ and over vessel A, a hopper, L', being placed between said pipe and rolls to lead the discharge to latter.

M and N are pipes for supplying water to suspension-chambers C' D over the surface of mercury, in order to dilute the waste therein and cause it to flow freely.

O is a pump, and P a strainer for withdrawing mercury or amalgam from chamber C', straining the same, and returning the mercury to pan I, into which it may be discharged through any suitable spraying device.

The operation is as follows: Mercury being supplied in sufficient quantity to vessels A and C so that when elevated by suction it will rise therein to or about the dotted lines $x\ x\ y\ y$, the pulp from pan I is supplied to tank K, and discharged by latter, as it rotates, into vessel C, the rotation of said tank affording a uniform distribution of the pulp in vessel C, as well as its agitation therein, by means of pipe $k$. From vessel C the pulp is lifted by action of ejector F into chamber D, the amalgam, by reason of its superior gravity, being detained in said chamber while the waste is drawn off and discharged from pipe $d$. Falling upon the rollers L L, any coarse particles in the waste not previously crushed are pulverized, the entire mass falling into tub A, and passing thence to chamber C'. In the passage through the suspended mercury any of the ore not previously amalgamated is therein amalgamated, and any amalgam or mercury which escaped with the waste from the first chamber is therein arrested and detained. The inflow of water through pipes M N dilutes the waste, so as to cause it to flow readily from the suspension-chambers under the influence of the ejectors. As the mercury in the vessels C' D becomes thickened by amalgamation with the ores entering thereto and combining therewith it is withdrawn by pump O and forced through strainer P, being thence returned to pan I.

Owing to its passage successively through two chambers, any ore which may have avoided amalgamation before reaching the second chamber will be amalgamated in the latter, and any amalgam or mercury which may have escaped from the first chamber will be caught in the second. By the provision of the crushing-rollers between the two chambers C' D any ore not sufficiently crushed, and which, by reason thereof, has passed through the first chamber without amalgamation, will be thoroughly pulverized before reaching the second chamber, so as to insure its amalgamation in the latter.

What I claim as my invention is—

1. The combination of two separate and independent suspension-chambers, one of which surrounds the other, and has an outside connection therewith, with discharge-pipes having ejectors therein, whereby a column of mercury may be elevated in each chamber and ore caused to pass successively through both.

2. The chamber C, having a central elevation or dome, c, in combination with vessel A and chamber D, whereby two separate and independent suspension-chambers are provided, substantially as and for the purpose set forth.

3. The combination of vessel C, having central elevation or dome, c, cylinder D, with discharge-pipe d and ejector F, and tub or tank A, having central discharge, B, with ejector E, whereby two separate chambers are provided with communication between them, and means for elevating mercury therein and causing ore to be drawn through the same, substantially as described.

4. In combination with vessel C and central dome or suspension-chamber, C', the rotating tank K, having discharge k, and adapted and designed to uniformly distribute the pulp from pan I, substantially as shown and described.

5. In combination with two suspension-chambers, C' D, having discharge-pipes B d, with their ejectors E F, one of which receives the discharge from the other, crushing-rollers L L, located to receive said discharge and crush any coarse particles therein, substantially as shown and described.

In testimony that I claim the foregoing I have hereunto set my hand this 8th day of July, 1880.

ALEX. V. TRUST.

Witnesses:
M. PARPART,
OTTO E. FIGGE.